O. C. FENLASON.
COLLAPSIBLE VENEER CARTON FOR EGGS AND FRUIT.
APPLICATION FILED DEC. 3, 1915.
1,178,003.
Patented Apr. 4, 1916.
3 SHEETS—SHEET 1.
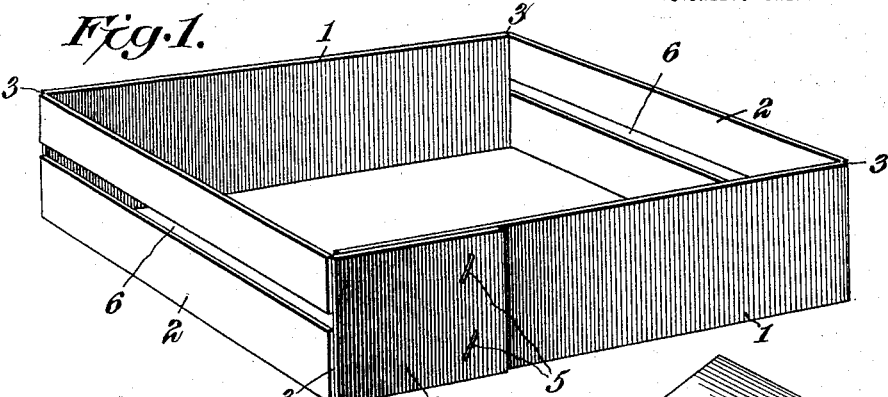
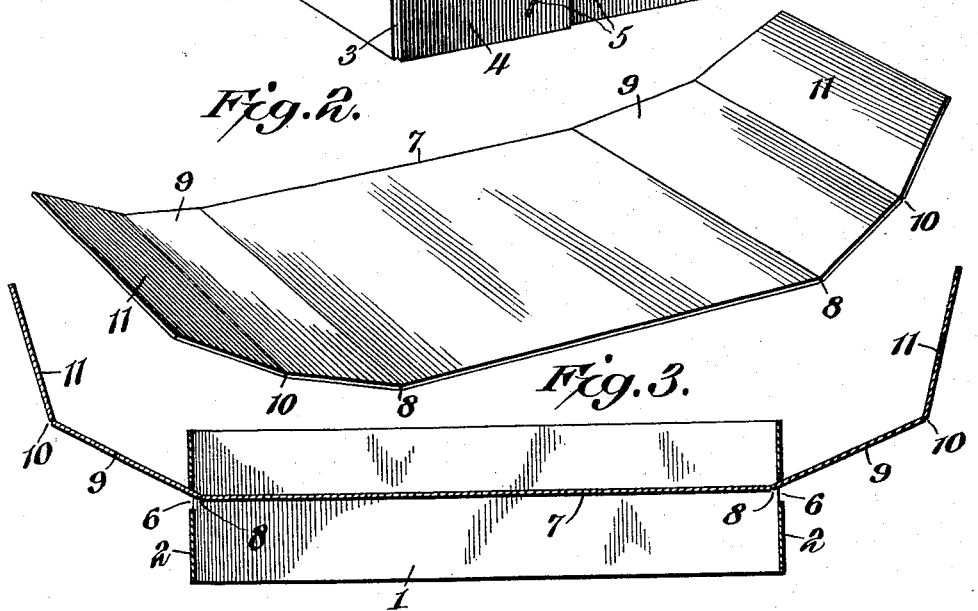
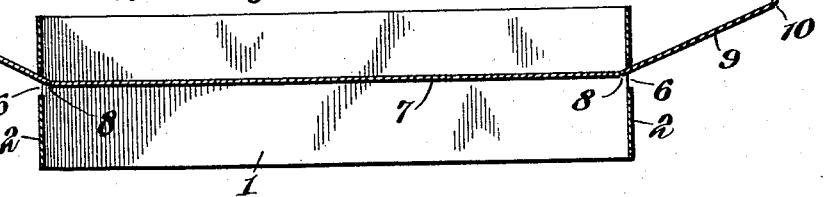
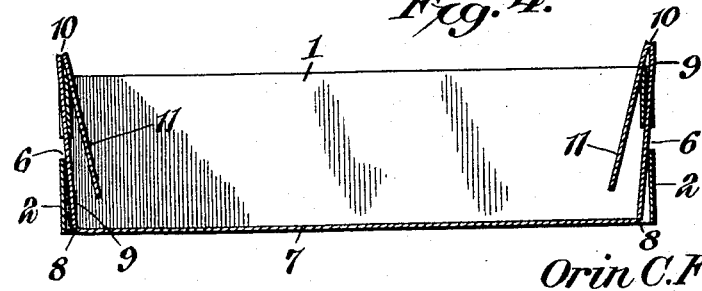
WITNESSES:
Jno. R. Ray.
Howard D. Orr.
Orin C. Fenlason,
INVENTOR,
BY E. G. Siggers
Attorney
THE COLUMBIA PLANOGRAPH CO., WASHINGTON, D. C.

O. C. FENLASON.
COLLAPSIBLE VENEER CARTON FOR EGGS AND FRUIT.
APPLICATION FILED DEC. 3, 1915.
1,178,003.
Patented Apr. 4, 1916.
3 SHEETS—SHEET 2.
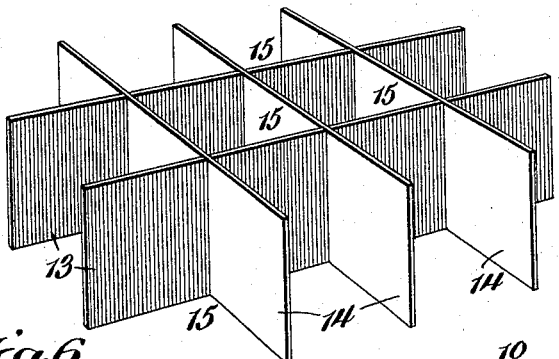
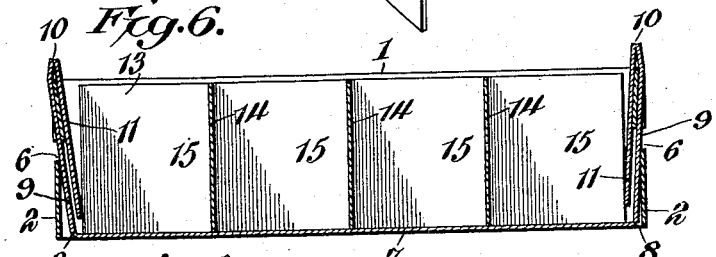
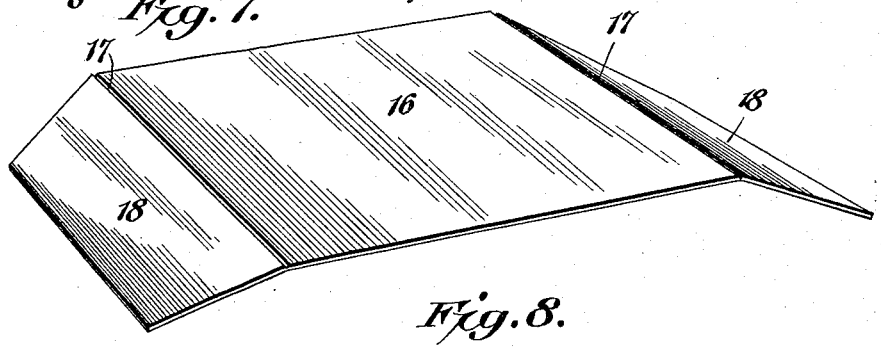
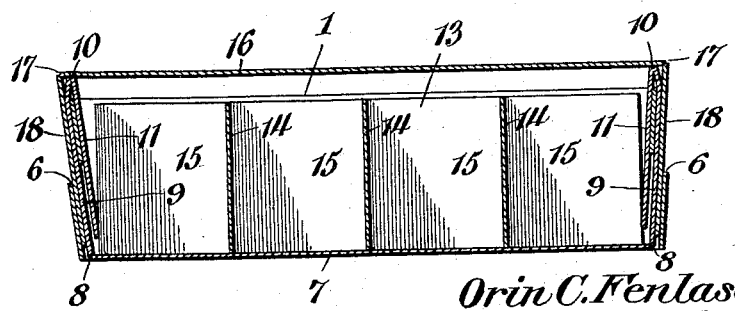

O. C. FENLASON.
COLLAPSIBLE VENEER CARTON FOR EGGS AND FRUIT.
APPLICATION FILED DEC. 3, 1915.
1,178,003.
Patented Apr. 4, 1916.
3 SHEETS—SHEET 3.
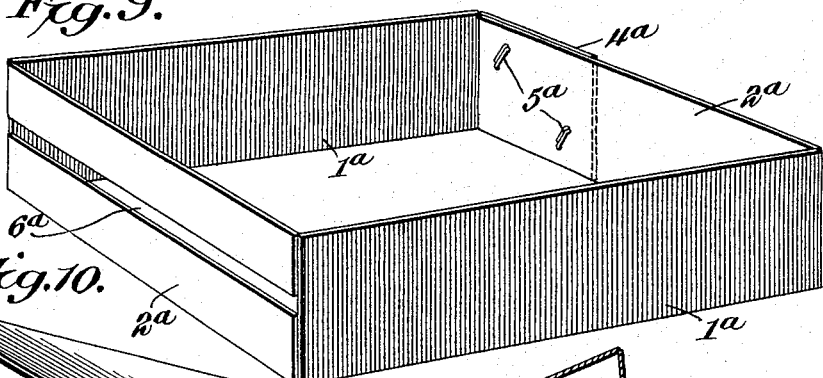
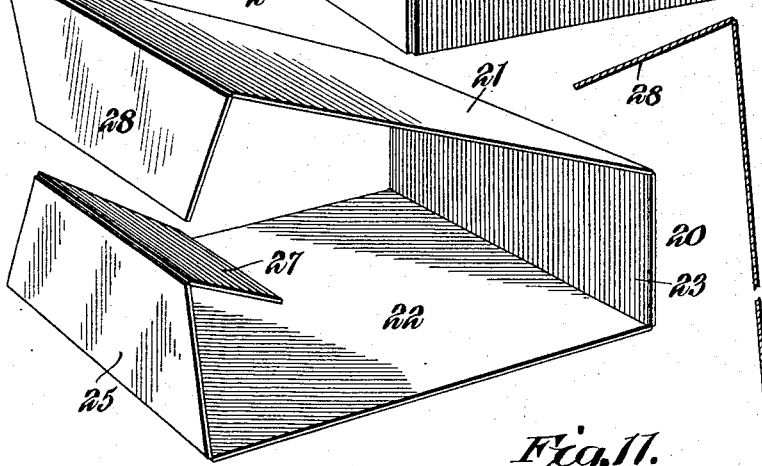
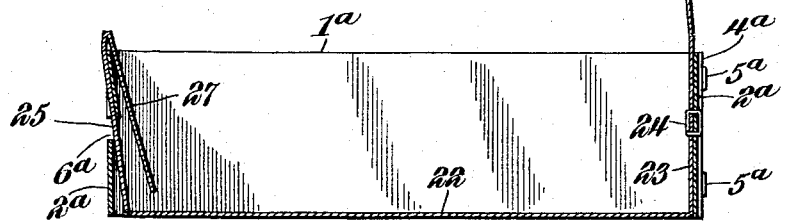
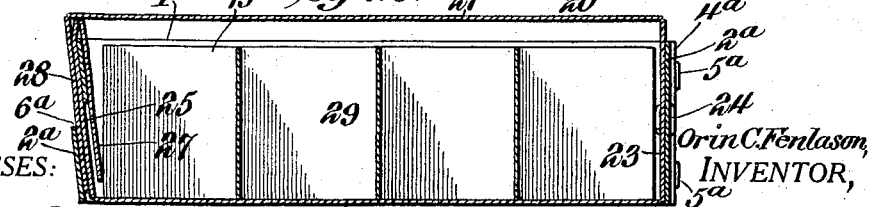
Orin C. Fenlason,
INVENTOR,
WITNESSES:
BY
Attorney

UNITED STATES PATENT OFFICE.

ORIN C. FENLASON, OF RAYMOND, WASHINGTON.

COLLAPSIBLE VENEER CARTON FOR EGGS AND FRUIT.

1,178,003.  Specification of Letters Patent.  Patented Apr. 4, 1916.

Application filed December 3, 1915. Serial No. 64,892.

*To all whom it may concern:*

Be it known that I, ORIN C. FENLASON, a citizen of the United States, residing at Raymond, in the county of Pacific and State of Washington, have invented a new and useful Collapsible Veneer Carton for Eggs and Fruit, of which the following is a specification.

This invention relates to collapsible veneer cartons for eggs, fruit and the like.

The object is to provide a veneer carton for holding a number of eggs, or a quantity of fruit, in spaced relation to each other in such manner as to protect the eggs or fruit from damage, and to provide a structure which permits of the ventilation of the same, in order that the contents may be kept fresh and in good condition.

Another object is to construct a veneer carton or box of this character with a minimum number of parts and fastening means for holding the same together, and to so score the sheets or pieces of veneer composing the several parts for the purpose of providing for the necessary bends, as to obviate the necessity of passing the parts through the scoring machine more than once, which results in a great saving of labor and a consequent reduction in the cost of production.

A further object is to provide a collapsible or knock-down structure, which may be compactly folded and packed together in large quantities for shipment to the purchaser, to whom the simple manner of setting up or assembling the parts will become readily apparent, owing to the extreme simplicity of the construction.

A full and complete understanding of the invention may be obtained from a careful consideration of the following detailed description, taken in connection with the accompanying drawings forming a part of this specification; it being understood that while the drawings show a practical form of the invention, the latter is not confined to strict conformity therewith, but may be changed or modified, as long as such changes or modifications mark no material departure from the salient features of the invention, as specifically pointed out in the claims hereto appended.

In the drawings, in which like reference characters designate like parts in each of the several figures:—Figure 1 is a perspective view of the body member of the improved carton. Fig. 2 is a perspective view of the bottom member. Fig. 3 is a longitudinal sectional view of the body member, showing the bottom applied. Fig. 4 is a similar view, showing the bottom member in its proper position, with the cell case or member omitted. Fig. 5 is a perspective view of the cell case or compartment member. Fig. 6 is a longitudinal sectional view, showing the cell case or compartment member in its proper position within the carton. Fig. 7 is a perspective view of the lid or cover. Fig. 8 is a longitudinal sectional view showing the lid or cover in its applied position on the box or carton. Fig. 9 is a perspective view of a slightly modified form of body. Fig. 10 is a perspective view of a combined top and bottom member used in connection with the body member shown in Fig. 9. Fig. 11 is a longitudinal sectional view of the two members in their assembled positions. Fig. 12 is a longitudinal sectional view of the same showing the cell case or compartment member applied thereto, and the lid held in its closed position.

Referring to the drawings, there is shown in Fig. 1 a rectangular body member composed of ordinary commercial wood veneer, and consisting of two sides 1, and ends 2. This body member is composed of a strip of veneer and is scored as indicated at 3 crosswise of its length, and at the proper points, to provide, when bent, the aforementioned sides and ends. The strip of veneer is somewhat longer than the combined lengths of the sides and ends, thus providing an extension 4, which is lapped around one corner of the body member and made fast to the adjacent end of the strip by staples 5.

Each end 2 is provided with a longitudinal slot 6, arranged substantially in the horizontal center of the ends and extending entirely across the same from side to side. The proportions of the body member are preferably such as to permit of carrying one dozen eggs or other articles.

A bottom member 7, composed likewise of veneer and of a width approximately equal to the length of the ends 2, is adapted to be introduced through either one of the slots 6, and to be forced down until the portion that constitutes the bottom lies substantially flush with the bottom edges of the sides and ends. The bottom member is scored on one side thereof, as indicated at 8 to provide terminal extensions 9, 9, which are slightly tapered from the point of scoring 8 to the ends of the strip of veneer composing the bottom member. This tapered formation is for the purpose of facilitating the introduction of the bottom member into the slots 6. The extensions 9 are again scored at 10, and on the same side of the strip as the score 8, to provide terminal flaps 11 to serve a purpose to be hereinafter described.

As shown in Fig. 3, the bottom member, after being introduced into the slots 6 may be readily depressed to assume the position shown in Fig. 4, when that portion of the extensions 9 adjacent to the bottom portion 7 and forming the end walls will extend upwardly and outwardly through the slots 6 in the end members 2. The terminal flaps 11 are then bent inwardly and downwardly into the body member, and normally assume an inclined position, the lower ends being spaced from the bottom member 7, and likewise spaced a short distance from the ends 2, as indicated in Fig. 4.

A cell case or compartment member is adapted to be introduced into the body member after the bottom has been applied thereto in the manner described. This compartment member, as shown in Fig. 5, consists of longitudinal and transverse strips 13 and 14 respectively, formed of veneer and suitably slotted to interfit and form compartments or cells 15 for the reception of eggs, fruit, or other articles. The length of the longitudinal strips 13 is somewhat less than the length of the sides 1, and the length of the transverse strips 14 is correspondingly less than the length of the ends 2, thus permitting of the ready introduction of the cell case or compartment member within the body member, and forcing back the terminal flaps 11 toward the ends 2. This exerts an inward pressure on the ends of the longitudinal strips 13 and results in maintaining the cell case or compartment member in its proper position and hold it from movement, as illustrated in Fig. 6.

The lid or cover 16, as shown in Fig. 7, is composed of veneer and of a width substantially equal to the width of the bottom member 7. It is adapted to rest on the upper edges of the members 9 and 11, where the scoring 10 takes place and, by reason of the member 9 being somewhat longer than the height of the end walls 2, the lid or cover 16 is spaced away from the upper edges of the sides and ends 1 and 2, thus permitting the contents of the cells or compartments to be amply ventilated. The lid or cover 16 is suitably scored on one side, as indicated at 17 to provide end flaps 18, the sides of which are tapered.

In applying the lid 16 to the carton after the cell case or compartment member has been introduced and the cells filled, it is only necessary to place the same on the upper edges of the members 9, and to pass the tapered end flaps 18 inwardly and downwardly into the slots 6, between the end walls 2 and the upwardly extending members 9, when, by reason of the tension placed on the upper and lower portions of the end walls 2, the lid or cover 16 is frictionally held in its proper position over the contents of the box or carton.

In Fig. 9, there is shown a somewhat slightly modified form of body member, composed of sides 1ª and ends 2ª, similar to that shown in Fig. 1, but having only one end slotted, as shown at 6ª. The other end 2ª is imperforate and is adapted to be secured by staples 5ª to the member 4ª extending from one of the adjacent sides 1ª.

A combined top and bottom member 20 consisting of a continuous strip of veneer, is suitably scored on one of its faces to provide the top 21, bottom 22, and an intermediate end wall 23. When the member 20 is straightened out and the top member 21 introduced into the end slot 6ª, it is adapted to normally lie flat against the opposite or imperforate end 2ª, and to be secured thereto by one or more staples 24. When the member 20 is thus secured in position, the bottom 22 lies flush with the lower edges of the sides and ends 1ª and 2ª, and extends across the body member to within a short distance of the slotted end 2ª, where it is provided with an end wall 25 tapered along its side edges, and having its end properly scored to provide a terminal flap 27 which latter, together with the end wall 25 will assume the same position with relation to the slotted end 2ª, as do the corresponding parts shown in Figs. 1 to 8. The end wall 23 is of a height equal to the opposite end wall 25, and thus the top member 21 which is bent at right angles to the wall 23, is adapted to lie in a horizontal plane across the top of the body member and to rest on the upper edges of the members 25 and 27. The end of the top 21 opposite to the wall 23 is provided with a tapered terminal flap 28, which is adapted to be bent at right angles to the top 21 and to pass down on the outside of the upper portion of the member 25 and to be introduced into the slot 6ª between the lower portion of the end wall 2ª and the outer face of the end wall 25, and to serve to maintain the top member 21 in its closed position, after the cell case or compartment member 29 has been introduced in the device, and the same has had its cells or compartments supplied with eggs, fruit, or other articles.

The terminal flap 27 in the last described form of the invention serves to exert an inward pressure against the adjacent ends of the longitudinal strips comprising the cell member 29 and to hold the same in engagement with the opposite end wall 23, thus preventing the same from becoming dislodged. As in the first described form of the invention, a ventilating space is provided between the top member 21 and the top edges of the sides and ends, to form ventilating means for the contents of the cells.

From the foregoing, it will be seen that a collapsible egg or fruit carton has been provided, which may be folded up and packed together to occupy a minimum amount of space, and which may be readily set up or assembled, and since the device is composed entirely of wood veneer, it will be seen that the structure is of such a nature as to permit of its manufacture at a very low cost. Indeed it is much cheaper than the paper cartons now in use.

What is claimed is:

1. A collapsible veneer carton comprising a rectangular body formed of side and end walls, one of the end walls being provided with a slot extending from side to side, a bottom member located within the body member and having an end passed upwardly and outwardly through the slot and terminating in a downwardly and inwardly extending flap arranged on the inside in spaced relation to the adjacent end wall, and a cell case or compartment member arranged within the body member upon the bottom member and between the opposite end walls of the body member, the flap bearing against the adjacent end of the cell case or compartment member.

2. A collapsible veneer carton including a body member composed of veneer which is scored and bent to form sides and ends, one of the ends having a slot extending the entire length thereof, a bottom member composed of a single strip of veneer of a width substantially equal to the distance between the sides of the body member, said strip being scored at intervals on one face and having an end passed upwardly and outwardly through the slot and terminating in a flap which is arranged on the inside of the carton and extends downwardly and terminates short of the bottom, said flap being spaced from the adjacent end wall of the carton, and a cover having an end passed downwardly through the said slot outside the bottom member and between it and the slotted end wall of the body member.

3. A collapsible veneer carton comprising a rectangular body member made of veneer and formed of ends and sides, the ends having transverse slots extending from side to side, a bottom member having its ends passed upwardly and outwardly through the slots and terminal flaps extending downwardly and inwardly from the upper edges of the ends of the bottom member, and a cell member resting upon the bottom and frictionally engaged by the flaps to retain the cell member in position.

4. An egg or fruit carton comprising a body member formed of a single strip of veneer, scored and bent to form sides and ends, the ends being provided with slots extending from one side to the opposite side, a bottom composed of a single strip of veneer scored on one face thereof to provide end walls and terminal flaps, said bottom fitting within the body member and having the said end walls extending upwardly and outwardly through the slots, and the terminal flaps bent downwardly and inwardly toward the bottom, a cell case or compartment member adapted to be held in position upon the bottom by the terminal flaps, and a lid or cover having end flaps passing downwardly through the said slots outside the end walls of the bottom to maintain the said lid in spaced relation to the compartments.

In testimony that I claim the foregoing as my own I have hereto affixed my signature in the presence of two witnesses.

ORIN C. FENLASON.

Witnesses:
 CLARENCE H. POST,
 CHARLES A. WOOD.